Patented Feb. 5, 1952

2,584,405

UNITED STATES PATENT OFFICE 2,584,405

PREPARATION OF SILICA-BORIA CATALYSTS CONTAINING ALUMINA OR MAGNESIA

James P. West, Westmont, Ill., assignor to Universal Oil Products Company, Chicago, Ill., a corporation of Delaware No Drawing. Application December 27, 1949, Serial No. 135,293

16 Claims. (Cl. 252—432)

This invention relates to the preparation of catalytically active composites containing silica, boron oxide and a third component selected from alumina and magnesia, the resulting composition as prepared in accordance with the process provided herein being particularly useful in catalyzing hydrocarbon cracking reactions for the production of motor fuels in which high-boiling petroleum fractions are utilized as charging stocks. More specifically, the invention concerns catalytically active refractory composites comprising an intimate association of silica, boron oxide, and at least one component selected from the group consisting of alumina and magnesia which are prepared by a metathesis-type of reaction between an alkyl orthosilicate, a boric acid ester, and an organic acid salt of aluminum and/or magnesium at selected reaction conditions.

Silica-base catalysts containing alumina and/or magnesia in intimate association therewith have been widely known and utilized by the prior art as catalysts for effecting specific hydrocarbon conversion reactions, such as the cracking of high molecular weight petroleum hydrocarbons for the production of motor fuel gasolines therefrom. These catalyst composites heretofore known and utilized in the art have been prepared in most instances by impregnating a silica gel particle with the salt of aluminum and/or magnesium, and subsequently converting the aluminum and/or magnesium salt to the corresponding oxides. The resulting composites when prepared in this manner are characterized generally by their high densities and relatively nonporous structure as compared with the present catalyst composites of substantially similar composition. The use of catalysts having low densities and high porosities accompanied by high activities has become increasingly important since the advent of fluidized processes in the treatment of petroleum fractions, such as fluidized cracking processes.

High porosity and low density are particularly advantageous qualities in a catalyst when it is to be utilized in a fluidized process because of the ease of maintaining the catalyst in suspension in the reactant vapors during the process and resulting enhanced yields of product from a given charge of reactants. The silica-base catalysts prepared by the process of the present invention are characterized as having desirably low densities as well as high porosity and in addition to the customary silica, alumina and/or magnesia components of the catalyst composites of art, the present catalysts contain boron oxide which increases the catalytic activity, steam and heat stability of the catalyst compared to catalysts containing merely silica, alumina and/or magnesia. The present catalyst is therefore especially recommended for fluidized catalytic cracking and dehydrogenation processes wherein the aforesaid physical and catalytic properties are especially advantageous.

One object of the present invention is to prepare a catalyst composite containing silica, boron oxide, alumina and/or magnesia which is particularly active in promoting hydrocarbon cracking and dehydrogenation reactions, especially in fluidized processes of this type.

Another object of this invention is to provide improved silica-base catalysts containing boron oxide, alumina and/or magnesia which are free of foreign impurities normally tending to reduce the catalytic activity and life of the composite.

In one of its embodiments the present invention relates to a process for the preparation of a hydrocarbon conversion catalyst consisting of a composite of the oxides of silicon, boron, and at least one oxide of a metal selected from the group consisting of alumina and magnesia which comprises reacting a mixture of an alkyl orthosilicate, and a boric acid ester with at least one metal salt selected from the group consisting of the aluminum and magnesium salts in which the metal is joined to an organic radical through an oxygen atom, the reaction being effected for a time, temperature, and pressure sufficient to form a composite of said silica, boron oxide, and an oxide selected from the group consisting of alumina and magnesia substantially free of organic material.

Another embodiment of the invention relates to a process for the production of a catalyst comprising a composite of silica, boron oxide, and alumina which comprises reacting an aluminum salt of an organic acid with a mixture of an alkyl orthosilicate and a boric acid ester at a temperature of from about 150° to about 300° C., and at a pressure sufficient to maintain at least a portion of the reactants in liquid phase, and thereafter recovering from the residue said composite of silica, boron oxide, and alumina.

Still another catalyst which may be prepared by means of the present procedure is a silica-base, boron oxide and magnesia containing catalyst formed by a process which comprises reacting a mixture of ethyl orthosilicate, tributylborate, and magnesium diacetate at a temperature of from about 150° to about 300° C. and at a pressure sufficient to maintain at least a portion of the reactants in substantially liquid phase, and thereafter recovering a composite of silicon, boron and magnesium oxides in intimate association with each other from the reaction mixture.

Other objects and specific embodiments of the present invention will be hereinafter referred to in greater detail in the following further description of the invention.

The catalyst composites of the present invention containing silica and boron oxide as components common to all of said composite catalysts, are prepared by means of a metathesis-type of reaction between the esters of boric and silicic acids, that is, the alkyl borates and silicates, and a salt of magnesium and/or aluminum in which the metallic radical is joined to an organic radical derived from a weakly acidic organic compound such as a carboxylic acid, an alcohol, a phenolic compound, etc. through an oxygen atom contained in said organic compound. The preferred aluminum and magnesium salts in the present process are the fatty acid carboxylates of the lower fatty acid series, preferably containing fewer than about six carbon atoms. The boric acid and silicic acid esters are preferably selected from the aliphatic alcohol esters containing at least two and not more than about five carbon atoms per molecule, such as ethyl orthosilicate, propyl orthosilicate, trimethoxyboron, triethoxyboron, tripropoxyboron, triisobutylborate, tri-isoamylborate, etc. These latter silicic acid and boric acid esters are preferred because of the desirability of maintaining substantially liquid phase during the course of the metathesis reaction, the esters of the alcohols containing from about 2 to about 5 carbon atoms per molecule having boiling points sufficiently high to enable the same to be maintained in liquid phase without resorting to unduly high superatmospheric pressures at the reaction conditions herein specified. Further preference is accorded the latter silicic acid and boric acid esters because of their relative cheapness, general availability, and because of the fact that the organic radicals of the present reactant are not directly involved in the metathesis reaction but serve merely as convenient salt and ester derivatives of the desired metal oxides and may be readily volatilized from the reaction mixture leaving no foreign metal oxide impurities which may adversely affect the catalytic and physical properties of the ultimate catalyst composite.

The reactant utilized in the formation of the present catalytic metal oxide composites referred to herein as a salt of a metal selected from at least one of the group consisting of aluminum and magnesium in which the metallic radical is joined to an organic radical through an oxygen atom bridge are preferably selected from the salts of the monocarboxylic acids and particularly from the members of the fatty acid series, although aluminum and/or magnesium salts of other weekly acid organic compounds containing oxygen and a metal-replaceable acidic hydrogen atom, such as the aliphatic alcohols, the phenols, etc., may likewise be utilized. Suitable aluminum and/or magnesium salts of organic acids containing an oxygen atom joined to the aluminum and/or magnesium group are the various carboxylic acid salts such as the formates, acetates, the trichloroacetates, dichloroacetates, the monochloroacetates, the oxalates, the malonates, the succinates, the tartrates, the benzoates and homologues thereof. Such magnesium and aluminum salts of organic acids are generally prepared by reacting the corresponding aluminum or magnesium oxide ores with the particular acid desired at a superatmospheric pressure sufficient to maintain the acidic reactant in substantially liquid phase, and in the presence of an excess of the acid, generally from about 6 to 1 to about 12 to 1 molar proportions of the acid to the metal oxide ore. The product in the case of reacting alumina, such as aluminum oxide trihydrate, with a carboxylic acid such as acetic acid is generally a mono-basic aluminum salt of the acid, the equation representing the formation of basic aluminum acetate being as follows:

$$Al_2O_3 \cdot 3H_2O + 4HOOCCH_3 \rightarrow$$
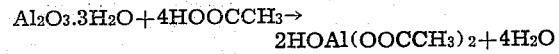
$$2HOAl(OOCCH_3)_2 + 4H_2O$$

The reaction of magnesia with a carboxylic acid forms the corresponding dicarboxylate salt in the presence of an excess of the acid. The preferred carboxylic acid salts in the metathesis reaction for the production of the present catalyst composite are the aluminum and magnesium acetates and formates.

Other aluminum and magnesium salts of weakly acidic organic oxygen-containing compounds in which the metallic ion is joined to an organic radical through an oxygen group are represented by the salts of acid-acting hydroxyl compounds containing a weakly acidic hydrogen atom, such as the aliphatic alcohols and the phenols. Aluminum and magnesium alkoxides and phenolates may be prepared by any suitable method, a particularly preferred procedure comprising heating an aliphatic alcohol, preferably a member of the lower alcohol series such as methanol, ethanol, propanol, isopropanol, butanol, etc. with aluminum or magnesium at a temperature generally of the order of about 120° C., or higher, depending upon the alcohol utilized, and if desired, in the presence of a catalyst selected from the soluble mercuric salts, such as mercuric chloride. The resulting aluminum alkoxide or phenolate is separated from the reaction mixture, preferably by distillation therefrom at sub-atmospheric pressures, generally below about 100 mm. mercury absolute. When it is desired to prepare an ultimate catalytic composite containing both alumina and magnesia, a mixture of magnesium and aluminum alkoxides or phenolates may be prepared simultaneously by reacting an alloy of the metals or a mere physical mixture of particles of the metals with the desired alcohol or phenol.

The reaction of a mixture of silicic acid and boric acid esters with an organic acid salt of magnesium and/or aluminum to form a catalytically active composite containing silica, boron oxide, magnesia, and/or alumina, depending upon whether a salt of magnesium or aluminum individually or a mixture of the two metal salts is employed in the metathesis reaction, is effected at temperatures within the range of from about 150° to temperatures below the normal decomposition point of the metal salt, generally about 300° C., and preferably at temperatures of from about 200° to about 250° C. The reaction mixture is preferably maintained at a pressure sufficient to provide substantially liquid phase conditions within the reaction mixture, generally up to about 100 atmospheres. Such pressures may be obtained in the reaction mixture by charging an inert gas, such as nitrogen, carbon monoxide, etc., into the reactor at the desired pressure prior to heating the mixture to the reaction temperature. The proportion of the respective reactants utilized in the metathesis reaction, that is, the esters of boric and silicic acids and the organic metal salt or salts, is dependent upon the ultimate composition desired in the final catalyst. Desirable and highly effective hydrocarbon cracking and dehydrogenation catalsts may contain from a relatively small proportion of combined alumina and magnesia in the final catalyst (generally not less than 2% by weight) to relatively large proportions thereof (up to about 95% by weight) and preferably from about 8 to about 20% of the final catalyst composite. The boron oxide content of the most effective catalytic composites with silica, alumina and/or magnesia is generally from about 2 to about 10% by weight of the ultimate composite, although the boron oxide component may advantageously be present in catalysts for some reactions in amounts up to about 30% by weight of the composite. In order to obtain a final composite containing the desired proportion of the respective oxide components, the theoretical stoichiometric proportions of the initial reactants which will react to yield the final composition is charged to the metathesis reaction mixture. Utilizing ethyl orthosilicate, for example, as the component of the metathesis reaction mixture capable of yielding the silica component of the ultimate catalyst composite, 1 mol of the ethyl ester of silicic acid, or approximately 208 weight equivalents of the ester, will yield 1 mol of silicon dioxide or approximately 60 weight equivalents thereof. Likewise, when utilizing magnesium di-acetate as the component of the reaction mixture capable of yielding the magnesia component of the ultimate catalyst composite, approximately 142.4 weight equivalents of the acetate will yield 1 mol of magnesia or approximately 40.3 weight equivalents thereof. Likewise, one molar equivalent of tri-isobutylborate (tri-isobutoxyborine), or 230.16 grams, yields approximately 70 grams of boron oxide in the metathesis reaction. It is not to be assumed, however, that exact molar equivalents of the silica and boron oxide-yielding reactant and the magnesia/or alumina-yielding reactants need necessarily be employed in the metathesis reaction, since the reaction proceeds in the presence of a molar excess of either reactant and the proportion thereof desired will ultimately depend upon the desired composition of the catalyst composite.

The product of the initial metathesis reaction generally contains an excess of at least one of said reactants, particularly when an ultimate catalyst containing a major proportion of silica or alumina is desired, and the excess reactant above that quantity required to react stoichiometrically in the metathesis reaction is usually present to some extent in the product of the initial reaction. In order to convert this excess, ordinarily contained in the initial product, to the corresponding metal oxide, the product of the initial reaction is subsequently heated to a somewhat higher temperature, preferably in the presence of water at superatmospheric pressures to hydrolyze the unconverted reactant to the metal oxide or hydroxide. Since the excess reactant required to react stoichiometrically with the other reactants is usually the silicic acid ester (that is, to ultimately prepare a catalyst containing a major proportion of the silica component, ordinarily utilized in hydrocarbon cracking reactions) heating of the initial reaction mixture thus ordinarily effects decomposition or hydrolysis of the excess silicic acid ester reactant forming silicon dioxide therefrom which becomes intimately admixed with the oxides formed by metathesis. Furthermore, if the initial reaction mixture contains any unconverted boric acid ester, magnesium and/or aluminum acid salt, the latter components are likewise converted to their respective metal oxides during the conversion of the initial reaction mixture at relatively elevated temperatures following the initial metathesis reaction. The above referred to heating operation or hydrolytic reaction is usually effected in a closed reactor system under pressure and at temperatures of from about 100° to about 350° C. to substantially free the reaction residue of volatile matter. In case the desired reaction is to be one of hydrolysis, water in sufficient quantity to hydrolyze the remaining silicic acid or boric ester or any residue of aluminum and/or magnesium organic acid salt is added to the reaction mixture and heated in a closed system at a superatmospheric pressure. The organic residues combined in the excess of the unconverted reactants are largely volatile and therefore are released from the reaction mixture following the completion of the secondary heating or hydrolytic reaction.

After completion of the secondary reaction, the product, usually a white, friable solid mass, is heated at a higher temperature to calcine the composite and activate the components for catalytic purposes. In the latter calcination, the reaction mass is heated to temperatures of from about 350° to about 800° C., usually in the presence of oxygen, such as a stream of air, which oxidizes any of the remaining organic residue to volatile components, which are removed from the catalyst reaction mixture and eliminated from the final composite. The resulting product may be ground to a powder and subsequently pelleted into pills of desired size for use in hydrocarbon conversion reactions or the original shape of the mass may be retained in its porous condition for use in the reaction. The reaction periods allowed for each of the preceding reaction steps is dependent upon the depth of conversion desired in each instance. For example, the initial metathesis reaction is usually completed during reaction periods of from about one-half to about four hours, although in most instances, from one to two hours is sufficient. The subsequent heat treatment of hydrolytic conversion is usually completed within ½ to about 3 hours, whereas the calcination stage of the process is desirably continued for a period of from about 2 to about 5 hours. The finished catalyst composites of the present invention are notably free of sodium ions and other extraneous foreign metallic impurities which often have an adverse effect on the catalytic activity and/or life of the catalyst composite. This is especially true when care is taken to select pure reactants or charging stocks, such as materials formed by subjecting the initial reactants to a purification treatment prior to the metathesis reaction. For example, a low grade aluminum oxide ore containing various extraneous impurities, such as iron, calcium, barium, etc. oxides or ions, may be substantially purified of said foreign impurities during the conversion of the alumina ore to the salt of aluminum. Thus, in the preparation of basic aluminum acetate by the reaction of an alumina ore with acetic acid at the temperatures and pressures hereinbefore specified, in most instances water-soluble acetate salts of the impurities, or salts which are soluble in the excess of the acid reagent are formed during the reaction which may be separated from the basic aluminum acetate product. The subsequently separated basic aluminum acetate when charged to the present reaction form composites which contain very little, if any, of the original impurities appearing in the alumina starting material. Catalysts of the prior art having a chemical composition somewhat similar to catalysts of this invention, in many cases contain alkali metal ions introduced into the composite during the preparation of the catalyst via precipitation of the metal oxides on a silica gel through the addition of an alkali metal hydroxide to a suspension of silica gel particles impregnated with a salt of aluminum and/or magnesium. The catalysts of this invention being free of deactivating foreign components, have higher activities and withstand repeated regeneration more effectively that has been observed in the case of even the most active catalysts of the prior art.

The novel method of preparing silica-base catalysts by the process herein provided through a metathesis-type of reaction is essentially responsible for the unusually low density and high porosity characteristics of the present composites. The subsequent calcination of the catalyst composite product, while in its highly porous state, results in the formation of a structurally rigid catalyst particle, capable of withstanding considerable surface pressure.

The process of the present invention is further illustrated in the following examples which are limited to the preparation of specific catalysts and are not intended to define the scope of the invention in strict accordance therewith.

Example I

A catalyst consisting of silica, alumina, and boron oxide was prepared in accordance with the present metathesis type of reaction by the following procedure. Eighty grams of basic aluminum acetate, 40 grams of ethyl-orthosilicate and 40 grams of tri-N-butylborate are charged into the glass liner of an 850 cc. capacity pressure autoclave. The autoclave was sealed and nitrogen gas charged into the apparatus at a pressure of 50 atmospheres. The autoclave was then heated to 210° C. for 6 hours as the contents of the reactor were stirred by rotating the autoclave. The reactor was allowed to cool to room temperature and the gases discharged to the atmosphere. Inspection of the autoclave contents indicated that 110 grams of a dry white powder was retained in the liner and 45 grams of liquid product comprising predominently ethyl acetate and small proportions of acetone, butyl acetate and a small quantity of unreacted ethyl-orthosilicate was recovered from outside of the liner within the autoclave. The powder was heated to 110° C. at 2 mm. pressure for 1 hour, yielding 78 grams of a dry residue and 29 grams of liquid overhead. The recovered powder, after calcination at a temperature of 500° C. for three hours, was crushed to particles sufficiently fine to pass through a 30 mesh screen. Analysis of the resultant catalyst composite indicated that it contained an equivalent of 21% silica, 51% alumina, and 24% boron oxide, the latter oxides being combined within the composite as complex boro-alumino-silicates.

The catalytic composite, as prepared in accordance with the above procedure, was utilized as a catalyst in a standard catalytic cracking test procedure to determine the activity of the composite for catalytically cracking a gas oil charging stock. In this test, a Mid-Continent gas oil fraction having an API gravity of 31.4 and an initial boiling point of approximately 460° F. was passed at a space velocity of approximately 4 volumes of said gas oil fraction per volume of catalyst per hour over a stationary bed of the catalyst contained in a tubular reactor maintained at a temperature of 932° F. The catalyst was on stream for a test period of approximately 2 hours, the gaseous and liquid products of the cracking reaction being separately collected and measured. The liquid hydrocarbon product boiling at a temperature above 400° F. was condensed in a receiver and the gaseous fraction, together with the gasoline product boiling up to about 400° F. was collected in a separate vessel. The weight per cent conversion on a once-through basis, expressed as the total weight of 400° F. E. P. gasoline formed in the conversion and uncondensed gas, divided by the weight of the gas oil charged, and the result multiplied by 100 was approximately 18.2. The yield of gaseous products in the reactor effluent was approximately 4.3 weight per cent of the gas oil charging stock. The ability of the catalyst composite to serve as a cracking catalyst, expressed as the weight per cent activity (the ratio of the weight percent conversion for the catalyst under test and the conversion for a standard silica-alumina cracking catalyst measured as 100, wherein the percent conversion is defined as the weight of liquid product boiling below 400° F. divided by the weight of gas oil charged to the cracking reaction) was 98 for the catalyst prepared as indicated above.

Example II

A silica-alumina-boron oxide composite, prepared by a procedure similar to the method employed in Example I above, except that the residue recovered from inside of the glass liner present in the pressure autoclave following the indicated metathesis reaction is removed from the liner, mixed with approximately 50 cc. of water and heated to a temperature of about 160° C. in the pressure autoclave for 2 hours, the recovered residue product dried at 110° C. for 5 hours, and calcined at 500° C. for 3 hours. The composite prepared in this manner contains an equivalent of approximately 35% silica, 50% alumina, and 12.5% boron oxide. When subjected to the catalytic cracking test procedure as described in Example I above, the catalyst has a weight percent activity of approximately 95%.

I claim as my invention:

1. A process for the preparation of a hydrocarbon conversion catalyst which comprises effecting a metathesis reaction of an alkyl-orthosilicate, a boric acid ester and at least one metal salt selected from the group consisting of aluminum and magnesium salts in which the metal is joined to an organic radical through an oxygen atom of at least about 150° C. but below the normal decomposition point of said metal salt.

2. The process of claim 1 further characterized in that said metal salt selected from the group of aluminum and magnesium salts is an alkoxide salt of an alcohol containing from about 2 to about 5 carbon atoms per molecule.

3. The process of claim 2 further characterized in that said alcohol is ethanol.

4. The process of claim 1 further characterized in that said metal salt selected from the group consisting of aluminum and magnesium salts is a carboxylic acid salt of an organic acid of the fatty acid series.

5. The process of claim 4 further characterized in that said fatty acid is formic acid.

6. The process of claim 4 further characterized in that said fatty acid is acetic acid.

7. A process for the production of a catalyst comprising a composite of silica, boron oxide and alumina, which comprises reacting an aluminum salt of an organic acid with a mixture of an alkyl-orthosilicate and a boric acid ester at a temperature of from about 150° to about 300° C., and at a pressure sufficient to maintain at least a portion of the reactants in substantially liquid phase, and thereafter recovering from the residue said composite of silica, boron oxide, and alumina.

8. A process for the production of a catalyst comprising a composite of silica, boron oxide and alumina, which comprises reacting an aluminum salt of an organic acid with a mixture of an alkyl-orthosilicate and a boric acid ester at a temperature of from about 200° to about 250° C., and at a pressure sufficient to maintain at least a portion of the reactants in substantially liquid phase, thereafter recovering from the residue said composite of silica, boron oxide, and alumina.

9. The process of claim 7 further characterized in that said aluminum salt is basic aluminum acetate.

10. The process of claim 7 further characterized in that said boric acid ester is tri-butylborate.

11. The process of claim 7 further characterized in that said alkyl-orthosilicate is ethyl-orthosilicate.

12. A process for the production of a catalyst comprising a composite of silica, boron oxide and alumina which comprises reacting an aluminum salt of an organic acid with a mixture of an alkyl-orthosilicate and a boric acid ester at a temperature of from about 150° to about 300° C., and at a pressure sufficient to maintain at least a portion of the reactants in substantially liquid phase, recovering a solid residue from the reaction product comprising the oxides of silicon, boron, and aluminum and calcining said residue at a temperature of from about 350° to about 800° C.

13. A process for the production of a catalyst comprising a composite of silica, boron oxide and alumina, which comprises reacting an aluminum salt of an organic acid with a mixture of an alkyl-orthosilicate and a boric acid ester at a temperature of from about 150° to about 300° C., and at a pressure sufficient to maintain at least a portion of the reactants in substantially liquid phase, recovering a solid residue product, reacting the same with water at a temperature of from about 100° to about 350° C. and calcining the resulting solid product at a temperature of from about 350° to about 800° C.

14. A process for the preparation of a catalyst composite comprising silica, boron oxide and magnesia which comprises reacting a mixture of alkyl-orthosilicate, a boric acid ester and magnesium salt in which the magnesium radical is joined to an organic radical through an oxygen atom, at a temperature of from about 150° to about 300° C. and at a pressure sufficient to maintain at least a portion of the reactants in substantially liquid phase, recovering a solid residue from the reaction product and calcining said residue at a temperature of from about 350° to about 800° C.

15. A process for the preparation of a catalyst composite comprising silica, boron oxide, and alumina which comprises reacting a mixture of ethyl-orthosilicate, tri-butylborate, and basic aluminum acetate at a temperature of from about 150° to about 300° C. and at a pressure sufficient to maintain at least a portion of the reactants in substantially liquid phase, recovering a solid residue from the reaction product and calcining said residue at a temperature of from about 350° to about 800° C.

16. A process for the preparation of a catalyst composite comprising silica, boron oxide, and alumina which comprises reacting a mixture of ethyl-orthosilicate, tri-butylborate, and basic aluminum acetate at a temperature of from about 150° to about 300° C. and at a pressure sufficient to maintain at least a portion of the reactants in substantially liquid phase, recovering a solid residue from the reaction product, interacting said residue with water at a temperature in excess of about 100° C. at a pressure sufficient to maintain the water in substantially liquid phase and calcining the recovered solid residue at a temperature of from about 350° to about 800° C.

JAMES P. WEST.

REFERENCES CITED

The following references are of record in the file of this patent:

UNITED STATES PATENTS

| Number | Name | Date |
| --- | --- | --- |
| 2,206,021 | Blunck | July 2, 1940 |
| 2,317,803 | Reeves et al. | Apr. 27, 1943 |
| 2,422,884 | Burgin | June 24, 1947 |